US008371936B1

(12) United States Patent
Durlacher

(10) Patent No.: US 8,371,936 B1

(45) Date of Patent: Feb. 12, 2013

(54) PARI-MUTUEL WAGERING METHOD

(76) Inventor: James M. Durlacher, Indianapolis, IN (US)

( * ) Notice: Subject to any disclaimer, the term of this patent is extended or adjusted under 35 U.S.C. 154(b) by 0 days.

(21) Appl. No.: 13/171,898

(22) Filed: Jun. 29, 2011

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. .................. 463/28; 463/6; 463/13; 463/16; 463/25; 463/42; 273/13; 273/274; 473/274; 705/37; 705/38

(58) Field of Classification Search ................ 463/6, 13, 463/16, 25, 28, 42; 273/139, 274; 473/274; 705/37, 38

See application file for complete search history.

(56) References Cited

U.S. PATENT DOCUMENTS

| | | | | |
|---|---|---|---|---|
| 6,331,148 | B1 * | 12/2001 | Krause et al. | 473/274 |
| 7,942,735 | B2 * | 5/2011 | Meyer et al. | 463/25 |
| 2003/0199315 | A1 * | 10/2003 | Downes | 463/28 |
| 2005/0102223 | A1 * | 5/2005 | Vlazny et al. | 705/38 |
| 2007/0087825 | A1 * | 4/2007 | Hart et al. | 463/28 |

* cited by examiner

*Primary Examiner* — Omkar Deodhar
*Assistant Examiner* — Adetokunbo Torimiro
(74) *Attorney, Agent, or Firm* — Woodard Emhardt Moriarty McNett & Henry LLP

(57) ABSTRACT

The disclosed pari-mutuel wagering method is directed to a sequential selection of two, three or four horses and the finishing position of the first horse in the selected sequence. A winning ticket is determined by three factors. These three factors include the correct sequential order of the selected horses, the correct finishing position for the first horse in the sequence and a corresponding finishing position selection by the racetrack based on a random draw.

11 Claims, 1 Drawing Sheet

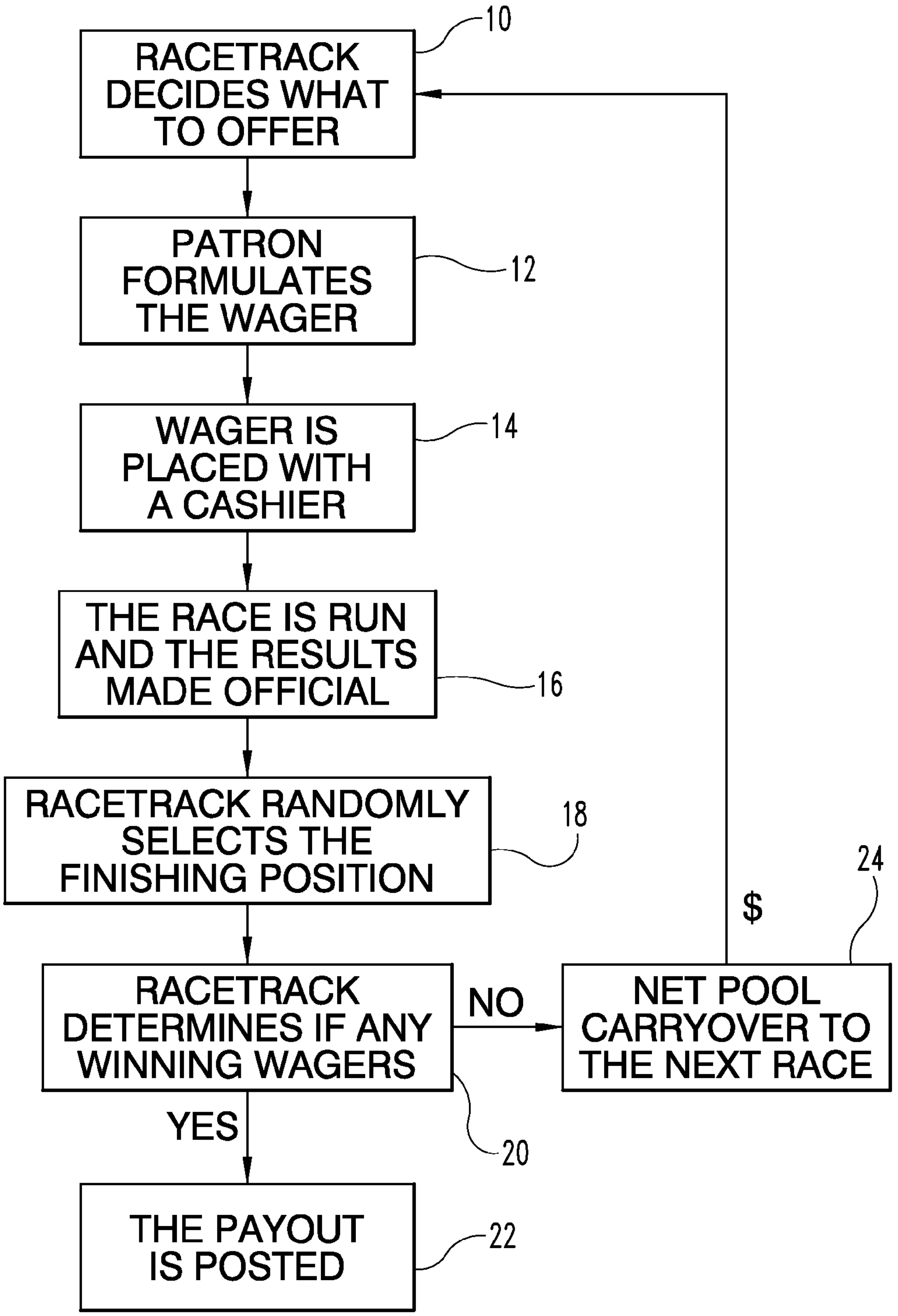
RACETRACK DECIDES WHAT TO OFFER
10
PATRON FORMULATES THE WAGER
12
WAGER IS PLACED WITH A CASHIER
14
THE RACE IS RUN AND THE RESULTS MADE OFFICIAL
16
RACETRACK RANDOMLY SELECTS THE FINISHING POSITION
18
RACETRACK DETERMINES IF ANY WINNING WAGERS
20
NO
NET POOL CARRYOVER TO THE NEXT RACE
24
$
YES
THE PAYOUT IS POSTED
22

PARI-MUTUEL WAGERING METHOD

CROSS-REFERENCE TO RELATED APPLICATION

This application claims the benefit of U.S. Provisional Application Ser. No. 61/360,988 filed Jul. 2, 2010.

BACKGROUND OF THE INVENTION

The wagering on thoroughbred horse races, as one example of pari-mutuel wagering, is based on selecting which horse (or horses) will finish in a particular position, such as win, place and show. Exotic wagering options, such as an exacta, trifecta, and superfecta, are based on selecting a plurality of horses in the correct order of finish in a single race. Other wagering options, such as a daily double, pick three, pick four, pick five and pick six, are based on selecting a horse in a specific position, in these cases in the first (i.e., win) position, in a plurality of sequential races. Occasionally wagering options are offered which involve selecting the winning horse in designated races at a plurality of different tracks. A still further wagering option, typically offered on a more limited basis, and often limited to the last race of the day, is what is called a "super high five". This involves selecting the first five finishing horses, in order, in a single race.

Regardless of the wagering option or scheme, the objective is to try and identify the horse or horses which will finish one or more races in a specific position, such as the winning horse in four consecutive races at the same racetrack (i.e., a pick four). Another example of this objective is to select the first three finishing horses in order in a single race (i.e., a trifecta).

One of the possible wagering options, as disclosed herein, which is not currently practiced at any racetrack is to select the relative sequential positions of two, three, or four horses regardless of their actual finishing positions in the race, such as win, place, show, etc. For example, if a patron who is handicapping a race wants to wager that horses X, Y, and Z will finish in that order somewhere in the overall order of finish, this type of wager is not currently offered but is provided by the disclosed method and thus creates another wagering option for racetracks and patrons alike. This new wagering option as disclosed herein should not reduce the racetrack's overall handle for that race relative to all other current wagering options being offered for the race since these current wagering options and the disclosed method or additional option are not mutually exclusive. Further, the disclosed method can be used for any type of competition or sporting event where wagering is permitted, where there are a plurality of competitors and where finishing positions are known and recorded.

Having a wide variety of wagering options is intended to appeal to a variety of wagering preferences of those patrons at the racetrack and those who attend off-track betting (OTB) sites. The variety of wagering options is also intended to increase the "handle" of the racetrack and thus the amount which the racetrack takes as income or funding for its activities and racing purses. For example, if a racetrack takes an average of sixteen percent (16%) of all wagered amounts, the greater the total handle for the racetrack, the more the racetrack has to work with as income. Accordingly, any wagering option which increases the total handle is advantageous for the racetrack. The only caveat is that a new wagering option or method might reduce the amounts typically wagered on other, existing wagering options. Therefore, one important aspect of trying to increase the total handle for the racetrack is to address current racing issues or situations where pari-mutuel wagering is traditionally low and find another or other options which increase the wagering for that particular race.

For example, when there is a relatively small field, such as five, six or seven horses, the level of pari-mutuel wagering is typically lower than a field with nine, ten or eleven horses. The level of pari-mutuel wagering may also be lower on the last race of the day as racetrack patrons elect to leave early in order to try and avoid some of the exiting traffic. Another lower pari-mutuel wagering situation can often be found when there is a heavy favorite, such as a horse with odds of 4:5 or in some instances as lopsided as 2:9. The typical pari-mutuel wagering options simply do not provide a suitable way for patrons to make any reasonable return under these circumstances. Assuming that the pari-mutuel odds reflect the likely outcome with a heavy favorite, traditional win, place and show bets would likely only return a very modest amount. Other pari-mutuel wagering options, such as an exacta wheel, with the heavy favorite on top, might pay a little more especially if the second place horse has long odds. However, in the event of a small field, the cost for that type of wager is easily handled by a majority of the patrons and thus the return would be modest, at best.

The pari-mutuel wagering method which is disclosed herein is directed to these lower wagering situations and the continuing desire of the racetrack to try and increase its handle (i.e., the amount which is subject to the racetrack's percentage). The disclosed pari-mutuel wagering method is considered an improvement to the currently offered wagering options since it provides other wagering options which address one or more of the lower wagering situations.

BRIEF SUMMARY

The disclosed pari-mutuel wagering method is directed to a sequential selection of two, three or four horses and the finishing position of the first horse in the selected sequence. A winning ticket is determined by three factors. These three factors include the correct sequential order of the selected horses, the correct finishing position for the first horse in the sequence and a corresponding finishing position selection by the racetrack based on a random draw.

One object of the present disclosure is to describe a new pari-mutuel wagering method.

BRIEF DESCRIPTION OF THE SEVERAL VIEWS OF THE DRAWINGS

FIG. 1 is a flow diagram of the primary steps involved for the pari-mutuel wagering method which is disclosed herein.

DETAILED DESCRIPTION

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

Referring to FIG. 1, there is illustrated a flow diagram which shows the sequence of steps for one of the new pari-mutuel wagering options disclosed herein. This disclosed wagering method is described as a "pari-mutuel" method since the wagering pool is paid out based on the number of winning tickets, after the racetrack takes out its percentage of the total pool for this particular type of wager. The method which is disclosed is designed to address one or more of the lower wagering situations as described above in the Background.

The first step 10 is for the racetrack to decide what wagering options will be permitted for a particular race and consider whether or not to permit one or more of the new pari-mutuel wagering methods according to this disclosure. If one of the disclosed wagering methods is offered as a pari-mutuel wagering option, the racetrack must decide whether the number of horses to be selected for the sequential listing of horses will be two, three, and/or four or perhaps a larger number. Following the format for exacta, trifecta, and superfecta wagering, it is thought that the disclosed sequential pari-mutuel wagering method would involve three different options, one for a two horse sequence, one for a three horse sequence, and one for a four horse sequence, each with their own separate pari-mutuel wagering pools.

As a first example of the disclosed pari-mutuel wagering method, assume that the racetrack will permit wagering on two horses in sequence in a race having seven horses ($H_1$, $H_2, \ldots, H_7$). This information is presented in print form in the programs and can be in electronic form as well. The wager, step 12 in FIG. 1, is for the patron to select any two horses in order such as $H_6$-$H_3$ and then select the finishing position for the first horse in this sequential pair, such as $H_6$-$H_3$, beginning with the fourth finishing position. The next step 14 is to place the wager, including the dollar amount, with a racetrack cashier. This step involves telling the cashier of the desired wager and then having the cashier manually enter that information into the machine in order to get a corresponding pari-mutuel ticket printed with the desired wager. This particular pari-mutuel wager means that the number 6 horse ($H_6$) will finish fourth and is followed immediately by the number 3 horse ($H_3$) in the fifth position. Even if the two selected horses finish in the wagered $H_6$-$H_3$ order, the wager is only a winning wager if a random draw of the finishing position for this race and for this type of wager at this racetrack is the fourth position.

In other words, if this wagering option is permitted for a race and is designed for two sequential horses, the racetrack randomly draws or randomly selects the position at the end of the race to find out if there are any winning tickets. One random selection option is to integrate a random number generator into the pari-mutuel system. The position which is randomly determined by the racetrack, in some fashion, must coincide with the position selected by the patron and the two horses in sequence beginning with that finishing position must also be selected. For example, consider a seven-horse field and the selection of two sequential horses for the wagering options, noting that three or four horses provide other wagering options with separate pools, if desired by the racetrack. At the conclusion of the race, once the results are official, step 16 in FIG. 1, the racetrack randomly draws or randomly selects in some fashion one position from the group of available finishing positions consisting of first, second, third, fourth, fifth, and sixth. This is step 18 in FIG. 1. Since the pari-mutuel wagering method disclosed herein does not wind around from seventh position to first position for the sequential pair of horses, the number of possible position draws for a two-horse wager is one less than the number of horses in the race. For a three-horse wager, according to the method disclosed herein, the possible position draws by the racetrack is two less than the number of horses in the race. For a four-horse pari-mutuel wager, according to the disclosed method, the number of possible position draws is three less than the number of horses in the race.

Once the race is run and the results made "official", it is preferable to promptly conclude the wagering results for the disclosed method. This requires, for the embodiment using a random selection of the "winning" finishing position, a randomly generated number. The available numbers for random selection are based on the number of horses in the race (i.e., the number of possible finishing positions) and the number of sequential selections for the wager, typically two, three or four horses. The number of finishing positions which are available for selection are as follows:

$1 \ldots n$ wherein: $n=N+1-w$ and wherein N=the number of horses in the race and w=the number of horses in the wager. For example, in a ten-horse race and a three (sequential) horse wager, the possible position draws (a random selection) are $n=10+1-3=8$. The random number possibilities are thus 1, 2, 3, 4, 5, 6, 7 or 8.

Continuing with a two-horse wager example, if the racetrack draws the third position (step 18), then the order of the two horses finishing third and fourth constitutes a winning pari-mutuel ticket. The racetrack then has to determine if there are any winning wagers (i.e., tickets) for this wagering option. This is step 20 in FIG. 1. If there is at least one winning ticket, the payout is posted (step 22). If there is no winning ticket, then there is a carryover (step 24) to the next race. In part this is why it is preferable to integrate the random number generator into the pari-mutuel system so that the number of possible draw positions can be automatically determined based on the number of horses in the wager and the number of horses in the race.

In the earlier example, assume that horses $H_6$-$H_3$ finish in that order in the fourth and fifth positions. Unless the racetrack draws the fourth position, this is not a winning ticket, even though those two horses finished in that order. The element of handicapping skill with regard to the disclosed method is to position the $H_6$ and $H_3$ horses in their exact order relative to each other and relative to the other horses in terms of their finishing positions. The element of luck is the random "draw" by the racetrack. In this particular example, once the $H_6$-$H_3$ sequence actually occurs, and those two horses finish in that order, there is a 1 out of 6 chance of having a winning ticket. However, if the patron wants to lessen the risk, albeit at an increased cost, this $H_6$-$H_3$ two-horse sequence could be placed in each of the six possible positions similar to a "wheel" wager. Then, so long as these two horses finish in this order, the wheeled wager will position this sequential pair at each of the possible six positions and thus it does not matter which finishing position is selected by the racetrack pursuant to the random draw. The reference to a random "draw" (step 18) is best performed by a computer-generated selection from a field of the available positions for the specific race, such as by a random number generation program.

One variation to the final step of a random number generation for the "winning" position is to eliminate this step and pay out the net pool based on all of the correct selections, i.e., winning wagers. A further variation on this optional approach is still use the final step and then switch to this alternative if there is no winning ticket. For example, consider a race which has the following order of finish:

| Finishing Position | Horse |
|---|---|
| $1^{st}$ | $H_6$ |
| $2^{nd}$ | $H_4$ |
| $3^{rd}$ | $H_3$ |
| $4^{th}$ | $H_1$ |
| $5^{th}$ | $H_8$ |
| $6^{th}$ | $H_5$ |
| $7^{th}$ | $H_2$ |
| $8^{th}$ | $H_7$ |

If there is a random number selection for a two-horse sequential wager, the possible finishing position numbers are 1, 2, 3, 4, 5, 6 and 7. Suppose further that the random number selection corresponds to the actual finishing position of $5^{th}$ in the selected race or event. Then the only winning tickets are those reading $H_8$-$H_5$ with horse $H_8$ in the $5^{th}$ finishing position. If there is no winning ticket, then consider the variation of paying out a consolation for all correct pairs. Under this option, the winning two-horse wagers (i.e., the number of possible sequential pairs) would include all of the following:

$H_6$-$H_4$
$H_4$-$H_3$
$H_3$-$H_1$
$H_1$-$H_8$
$H_8$-$H_5$
$H_5$-$H_2$
$H_2$-$H_7$

While this optional or alternative embodiment gives the patrons a greater number of possibilities for having a winning ticket, the per ticket payoff or payout would be proportionately less. This alternative could be the primary wagering option without any random number generation. Another option is to still have the random number generation for the "winning" finishing position, but then if there is no winning ticket, switch to the seven sequential pairs as "winners". A further subset option for the payout to each of these seven sequential pairs is to only pay out a portion of that net pool as a consolation payout with a majority of the net pool being a carryover to the next race. This is similar to a payout for five of six correct for a pick-six wager when there is no six of six winner.

The two-horse sequence can be changed to either three horses or to four horses or all of these options can be offered (step 10) with separate wagering pools for each, similar to the current handling of exact, trifecta, and superfecta wagering. These options are applicable to each embodiment. If there is no winner in a race for the applicable pari-mutuel wagering pool, then, after the racetrack takes its stated percentage of the applicable wagering pool or pools, the balance of each wagering pool can be carried over into the next race, see steps 20, 24 and 10. One other option as explained above is to have a secondary payout of the entire pool or a consolation payout of a portion of the pool. If there is no winning ticket in the next race, the respective pools simply accumulate and, based on the preferred embodiment, carry forward, race after race, until the last race of the day. As disclosed herein, there are specific procedures for a complete pay out of each pool after the last race of the day such that this particular wager, as disclosed herein, does not have a carryover to the next racing day. It is felt that by having a complete pay out at the end of the last race of the day that patrons may be inclined to stay for that last race of the day, particularly if there is a sizable carryover from earlier races in this same racing day.

In terms of wagering options and the number of bets which are possible, an exacta for a seven-horse field has forty-two (42) possible bets (7×6) or "all with all". When the new pari-mutuel method, as disclosed herein, is applied, there are these same forty-two possible bets multiplied by the number of possible position draws. For a seven-horse field based on a wager of two sequential horses, there are 252 possible bets (7×6×6). In order to cover all of the possibilities, each exacta permutation would have to be placed at each finishing position for the pair of horses which in this example would be the first position through the sixth position for this seven-horse field. For a nine-horse field, the seventy-two (72) exacta bets (9×8) increases to 576 possible bets (9×8×8). This increased number of possible bets means fewer winning tickets, larger pay outs per ticket, and the increased probability of having a carryover for this new wagering option.

All of the normal wagering permutations are possible with the new pari-mutuel wagering method disclosed herein. For example, a patron could box the $H_6$ and $H_3$ horses in order to cover both finishing orders for those two horses. Another option would be to select a three horse box, such $H_6$, $H_3$, and $H_4$, so that all six two-horse sequences would be covered for the selected finishing position of the first horse. The finishing position of the first horse in the pair must still be selected, even if multiple horses are boxed. However, one could box three horses as disclosed above and then "wheel" or "part-wheel" that box across several finishing positions. For example, one wagering options for a seven-horse field would be a two-horse sequential wager box of $H_6$, $H_3$, and $H_4$ wheeled across all six possible finishing positions. For a one dollar ($1) box, the total wager is $36 based on the six two-horse combinations spread across each of the six possible finishing positions for the first horse of the pair. With this particular type of pari-mutuel wager, the selection of a particular finishing position is not at issue. Instead, the patron must have boxed the two horses which finish in order for the position selected by the track. Since the three horse box described above covers only six possibilities out of a total of forty-two possibilities, there is only a one in seven probability of this wager being a winning wager. Alternatively, if all of the horses are boxed in an "all with all" wager, then there is one out of six probability of winning such that the finishing position draw becomes determinative. Based on the number of possible bets as explained above and the amount of a one dollar box which covers only a small portion of the total permutations, it is easy to see why there would be higher pay outs if there is a winning ticket or a likely carryover as the alternative.

The disclosed pari-mutuel wagering method addresses the issues of small fields since there are still numerous wagering options for greater handle, even with a small field such as six or seven horses as noted above. For example, in what might be a worst case scenario, consider a five-horse field which would have only twenty possible exacta bets as compared to 132 exacta bets for a twelve-horse field. However, for the disclosed pari-mutuel wagering method, there are 80 (5×4×4) possible two-horse sequential bets. This then converts the five-horse field to what would be comparable to a nine-horse field with seventy-two exacta bets.

The disclosed pari-mutuel wagering method also addresses the issue of having a prohibitive favorite such as one horse with 2:9 odds. Since the objective is not necessarily to handicap the winner but to handicap the sequence or order of any two horses, even if the two horses are the last two finishers in the race, the win odds become much less of a factor, essentially a non-factor. Consider for example, a six-horse race with a prohibitive favorite, say the number four horse ($H_4$). One likely exacta wager would be $H_4$ with all (a $5 wager for this $1 exacta wheel). However, for the sequential wagering method disclosed herein, using the same wheel concept, what if the racetrack draws finishing position number 3. Under this scenario, a sequential wheel with the heavy favorite on top in the first finishing position is not a winning ticket. Instead, the handicapper or patron would have had to select the third and fourth place horses, such $H_1$ and $H_5$, and this type of wager has nothing to do with the win odds on the $H_4$ horse. Even if the handicapper concludes that $H_1$ and $H_5$ will finish in that relative order, the handicapper still has to position theses horses in the correct finishing position and the racetrack still has to select that position based on its random draw or from the random number generation. With eighty possible bets as compared to twenty bets for an exacta with a five-horse field, the wagering options, according to the new pari-mutuel wagering method disclosed herein, are increased dramatically. While eighty possible bets or wagering possibilities likely means at least one winning ticket, what is the outcome of a ten-horse field? For example, with a ten-horse field, the number of possible bets for the new pari-mutuel wagering method disclosed herein is 810 (10×9×9) for a two-horse wager. At this number of possible bets, it becomes less likely that there will be a winner and thus a greater likelihood of a carryover to the next race. However, if there is a winning ticket, the pay out will likely be substantially more than what an exacta with a wheeled favorite would pay.

The carryover procedure from race to race continues until the last race of the day, at which point the entire pool balance, with any carryovers corresponding to this new pari-mutuel wager is paid out. If three-horse sequences and/or four-horse sequences are allowed by the racetrack, then each corresponding pool with each and any corresponding carryover is paid out in full after the last race of the day, after the track has taken its percentage share of each wagering pool.

If the final race of the day does not have at least one winning ticket for each pool for this new pari-mutuel wagering method, then each wagering pool for this new method or option is paid out according to the following methodology. The complete order of finish is determined such as, for example, $H_3$-$H_7$-$H_1$-$H_5$-$H_2$-$H_4$-$H_6$ for a seven-horse field. Then the consolation winning wagers which would share equally in the corresponding pool for a two-horse sequential wager are the paired horse sequences of $H_3$-$H_7$, $H_7$-$H_1$, $H_1$-$H_5$, $H_5$-$H_2$, $H_2$-$H_4$, and $H_4$-$H_6$. Again, these are "consolation" winner wagers if there is no winner according to the normal wagering methodology. If the wager pool is for a three horse sequence, then the consolation payouts are for $H_3$-$H_7$-$H_1$, $H_7$-$H_1$-$H_5$, $H_1$-$H_5$-$H_2$, $H_5$-$H_2$-$H_4$, and $H_2$-$H_4$-$H_6$.

If there is no winning ticket from the consolation approach as noted above, then each pool for the corresponding type of sequential wager is paid out equally for all tickets. In other words, if you placed a wager for this type of wagering option, you get a pro rata share of the net pool. Granted, while each wager is returned essentially dollar-for-dollar, less the percentage taken out by the racetrack, each ticket holder from the last race also gets an equal share of any carryover amount from prior races. Consequently, there would be an incentive to participate in this type of wagering option for the last race, simply as a way to secure a share of the carryover. If the carryover happens to be substantial, then the wagering on the last race may also be substantial since patrons would like to try and secure a larger overall proportion of the carryover. For example, assume that the carryover amount is $1000 and there are no winning tickets based on the normal wager and no winning tickets based on the consolation approach. Assume further that there are ten (10) tickets held by ten patrons and on the pro rata approach with each ticket being of the same value, those ten patrons would each receive $100 of the carryover amount. Now consider with this same example that one (1) of the ten (10) patrons has nine (9) wagers and this would thus represent fifty percent (50%) of the total wagers. This one patron would then receive half (½) of the carryover amount and thus a reason to wager more on the last race in hopes of securing a larger proportionate share of any carryover balance.

Another option for the last race of the day is to use the same type of alternative payout in earlier races if there is no winning ticket based on the random number generation for the "winning" finishing position. This option would pay out a pro rata share of the total net pool for each correct sequential pair (or triple, etc.) regardless of the selected finishing position of that wager. If the sequential pair is correct, it is a winning ticket. In order to avoid a carryover to the next racing day, the entire net pool of the last race of the day is paid out in some fashion for each of the corresponding wagering options.

The new pari-mutuel wagering approaches, methods or options and alternatives as disclosed herein, will encourage the racetrack patrons to remain for the last race of the day and to wager on this last race using the new wagering method or at least one version of it, in view of the possibility of a carryover from prior races and the probability of winning.

If a three-horse wagering option is offered, either in lieu of or in addition to the two-horse wagering options, there will be a new set of permutation numbers. For example, the total trifecta bets for a seven-horse field is 210 (7×6×5). With the new pari-mutuel wagering method as disclosed herein, there are 1050 possible bets (7×6×5×5). Although there is one fewer finishing position in the group for selection by random draw by the racetrack, five versus six, the larger number of starting permutations (210) as compared to the exacta permutations (42) for a seven-horse field still creates an extremely large number of possible bets, increasing the likelihood of a carryover to the next race. Similar numbers and calculations can be run for the wagering method or options disclosed herein using a four-horse sequence.

One variation to what has been described herein is to change the order of the events. Instead of the random selection or draw being made by the racetrack after the race results are official, this variation has the racetrack making the random selection or random draw of the finishing position of the first horse in the sequence before the race is run. One issue with this alternative approach or variation is if the first finishing position is selected or drawn. This would result in essentially making this new wagering option equivalent to an exacta (if two horses) or a trifecta (if three horses) or a superfecta (if four horses).

Although a pari-mutuel wagering method is described herein, this method includes various machine interactions and the providing, by machine, of important information and material as a part of the disclosed method. First, the racetrack must decide on the wagering options it will permit or offer for each scheduled race on each race day. If the wagering method which is disclosed herein is listed as an option for any race on that particular racing day, then the track must further decide on which horse combinations will be permitted for that race. The most likely options are to offer a two-horse sequential pair and/or a three-horse sequence and/or a four-horse sequence. This information is printed in the racing program of the track for that day and is also included in the Daily Racing Form®. Electronic media also carries this information including various websites directed to horse racing and online wagering.

The second machine interaction is when a wager is actually placed with the racetrack cashier or teller. The verbal information from the patron is related to the cashier and is then manually input into a machine terminal which is part of the overall pari-mutuel equipment and totalizator system. The portion of the machine or terminal which is operated by the cashier transforms the manually input wager information into a printed ticket which is then given to the patron. This ticket includes information such as the name of the track, the number of the race and the specific wager as well as the dollar amount for that wager. Once the race results are "official", assuming that a random number will be used for the "winning" finishing position, another machine or item or piece of equipment is then used to generate and display the winning finishing position. Whether this is accomplished by a random number generator or a similar computer arrangement, it is important that the selected finishing position for determining winning tickets is selected in a completely random fashion and is determined immediately after the race results are "official" and displayed accordingly. As noted above, in order to have a winning ticket, the wager must include the correct sequence or sequential series of horses and the first horse of that sequential listing must have finished the race in the position which corresponds to the random number which is generated. All of this information is further conveyed to the pari-mutuel equipment (totalizator) which is used by the racetrack for computation and display of the payout amounts based on each type of wager which was offered by the track for that particular race.

The random number generator and/or the computer number selecting means must be programmed with the number of possible numbers to select from (1, 2, . . . n) based on the number of horses in the race (i.e., the number of possible finishing positions) and the number of sequential horses which are available as wagering options (2 horses, 3 horses, etc.). Once programmed and once the selected finishing position is known, the pari-mutuel equipment computes the payout, if any, based on the net pool and the number of winning tickets. In order to collect any winnings which are appropriate to the particular patron, the patron presents the winning ticket to the cashier and the ticket is then read by the pari-mutuel equipment and the payout is displayed. The patron is then paid and the ticket is voided.

While the preferred embodiment of the invention has been illustrated and described in the drawings and foregoing description, the same is to be considered as illustrative and not restrictive in character, it being understood that all changes and modifications that come within the spirit of the invention are desired to be protected.

I claim:

1. A pari-mutuel wagering method for use with a racing event involving a plurality of competitors where an order of finish of said competitors is determined, wherein a plurality of wagering players are participating, said method comprising the following steps:

(a) selecting a racing event for which pari-mutuel wagering is permitted;

(b) selecting at least two competitors from said plurality of competitors;

(c) arranging said selected competitors in a desired sequential order of their finish in said racing event relative to each other;

(d) selecting the actual finishing position in said racing event of the first competitor of said sequential order;

(e) using a random number generator for randomly selecting a finishing position; and (f) determining if there are any winning wagers wherein a winning wager requires the correct sequential order of competitors and the first finishing competitor of said plurality of competitors finishing in said randomly selected finishing position.

2. The pari-mutuel wagering method of claim 1 wherein said plurality of wagering players each perform method steps (a), (b), (c) and (d).

3. The pari-mutuel wagering method of claim 2 which further includes the step of placing a wager on the racing event based on selecting step (d).

4. The pari-mutuel wagering method of claim 2 wherein there is a sponsor of said racing event and said sponsor performs steps (e) and (f).

5. The pari-mutuel wagering method of claim 4 wherein said sponsor performs the additional step of paying any winnings which are calculated as earned by one or more of said wagering players.

6. The pari-mutuel wagering method of claim 1 wherein there is a sponsor of said racing event and said sponsor performs steps (e) and (f).

7. The pari-mutuel wagering method of claim 6 wherein said sponsor performs the additional step of paying any winnings which are calculated as earned by one or more of said wagering players.

8. The pari-mutuel wagering method of claim 1 which further includes the step of placing a wager on the racing event based on selecting step (d).

9. A pari-mutuel wagering method for use with a competition event involving a plurality of competitors where an order of finish of said competitors is determined by the competitors, wherein a plurality of wagering players are participating, said method comprising the following steps:

(a) selecting a competition event for which pari-mutuel wagering is permitted;

(b) selecting a competitor from said plurality of competitors;

(c) placing said selected competitor in a desired finishing position in said competition event;

(d) randomly selecting a finishing position; and (e) determining if there are any winning wagers wherein a winning wager requires that the actual finishing position of the selected competitor corresponds to said randomly selected finishing position.

10. A pari-mutuel wagering method for use with a racing event which is run by a sponsor, said racing event involving a plurality of competitors where an order of finish of said competitors is determined, wherein a plurality of wagering players are participating, said method comprising the following steps:

(a) selecting a racing event for which pari-mutuel wagering is permitted;

(b) selecting at least two competitors from said plurality of competitors;

(c) arranging said selected competitors in a desired sequential order of their finish in said racing event relative to each other;

(d) selecting the actual finishing position in said racing event of the first competitor of said sequential order;

(e) having said sponsor randomly determine a finishing position; and (f) determining if there are any winning wagers wherein a winning wager requires the correct sequential order of competitors and the first finishing competitor of said plurality of competitors finishing in said randomly selected finishing position.

11. The pari-mutuel wagering method of claim 10 which further includes the step of placing a wager on the racing event after the selecting step (d).

* * * * *